United States Patent
Minamikawa

(10) Patent No.: US 8,654,418 B2
(45) Date of Patent: Feb. 18, 2014

(54) COPYING APPARATUS

(75) Inventor: Shunsuke Minamikawa, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 377 days.

(21) Appl. No.: 12/944,332

(22) Filed: Nov. 11, 2010

(65) Prior Publication Data
US 2011/0122463 A1 May 26, 2011

(30) Foreign Application Priority Data

Nov. 20, 2009 (JP) ................. 2009-264867

(51) Int. Cl.
H04N 1/387 (2006.01)
H04N 1/40 (2006.01)
G03F 3/08 (2006.01)

(52) U.S. Cl.
USPC ........... 358/501; 358/452; 358/453; 358/461; 358/518

(58) Field of Classification Search
None
See application file for complete search history.

(56) References Cited

U.S. PATENT DOCUMENTS

| | | | |
|---|---|---|---|
| 8,081,326 B2 | 12/2011 | Okunishi et al. | |
| 2004/0047666 A1* | 3/2004 | Imaizumi et al. | 400/76 |
| 2005/0179762 A1* | 8/2005 | Watanabe et al. | 347/115 |
| 2008/0130030 A1 | 6/2008 | Okunishi et al. | |
| 2008/0292370 A1* | 11/2008 | Murayama | 399/301 |

FOREIGN PATENT DOCUMENTS

| | | |
|---|---|---|
| JP | 2001-13753 | 1/2001 |
| JP | A-2003-307901 | 10/2003 |
| JP | 2007-219174 | 8/2007 |
| JP | A-2008-139484 | 6/2008 |
| JP | A-2008-203602 | 9/2008 |
| JP | A-2008-307731 | 12/2008 |
| JP | A-2009-075155 | 4/2009 |

OTHER PUBLICATIONS

Office Action dated Aug. 23, 2011 received from the Japanese Patent Office from related Japanese Application No. 2009-264867, together with an English-language translation.

* cited by examiner

Primary Examiner — Benny Q Tieu
Assistant Examiner — Haris Sabah
(74) Attorney, Agent, or Firm — Scully, Scott, Murphy & Presser, PC

(57) ABSTRACT

A copying apparatus includes: a reader that reads an image on a document; an image forming unit that forms on a recording medium the image read by the reader; and a detector configured to detect a color image from the image read by the reader and trigger the image forming unit to form a mark for image adjustment before forming the color image on the recording medium if the detector detects the color image.

12 Claims, 7 Drawing Sheets

COPYING APPARATUS

CROSS-REFERENCE OF APPLICATION

This application is based upon and claims the benefit of priority of Japanese Patent Application No. 2009-264867 filed on Nov. 20, 2009, the contents of which are incorporated herein by reference in its entirety.

BACKGROUND OF THE INVENTION

The present invention relates to a copying apparatus which forms a color image by superimposing a plurality of images. More specifically, the present invention relates to a copying apparatus which forms marks for image adjustment.

Generally, in copying apparatus having a color print function, images in the colors of cyan (C), magenta (M), yellow (Y), and black (K) are formed respectively and superimposed on each other to form a color image. In order to thus form a color image, a plurality of images must be superimposed, so that image adjustment is performed in the copying apparatus so as to prevent the positions and densities of the respective images from being deviated from each other. As steps of image adjustment, for example, a resist pattern as an image pattern for image adjustment is formed for each color, and deviations (adjustment values) between a resist pattern in a reference color and resist patterns in colors to be examined are acquired, and based on the adjustment values, the position deviations of the images in the colors to be examined are corrected.

In a copying apparatus which forms image patterns for image adjustment, during execution of image adjustment including formation of the image patterns, print processing for printing a read image cannot be executed. Therefore, if the image adjustment is, for example, started after an image is read, the start of print processing may be delayed. Therefore, for example, a related image forming device starts execution of image adjustment in response to an operation expected to execute printing before accepting a print command.

SUMMARY OF THE INVENTION

However, the conventional copying apparatus described above has the following problem. That is, when printing a black-and-white image, image adjustment for color printing is unnecessary. Therefore, when printing a black-and-white image, it is preferable that productivity is given preference and image adjustment is not performed. On the other hand, the conventional image adjustment is performed without judging whether or not a document image is a black-and-white image or a color image. Therefore, even if color printing is not executed, image adjustment may be executed, and this creates problems such as wasteful consumption of toner and a longer wait time for a user.

The present invention has been made to solve the problem of the conventional copying apparatus. That is, an object of the present invention is to provide a copying apparatus which can perform color printing and efficiently executes image adjustment for color printing.

According to an aspect of the invention, a copying apparatus includes:
a reader that reads an image on a document;
an image forming unit that forms on a recording medium the image read by the reader; and
a detector configured to detect a color image from the image read by the reader and trigger the image forming unit to form a mark for image adjustment before forming the color image on the recording medium if the detector detects the color image.

According to the present invention, a copying apparatus which can perform color printing and efficiently executes image adjustment for color printing is realized.

DETAILED DESCRIPTION OF EXEMPLARY EMBODIMENTS

Hereinafter, a copying apparatus according to an embodiment will be described in detail with reference to the accompanying drawings. In this embodiment, the present invention is applied to an electrophotographic copying apparatus with a color copy function and a black-and-white copy function.

Entire Configuration of Copying Apparatus

Figure 1:
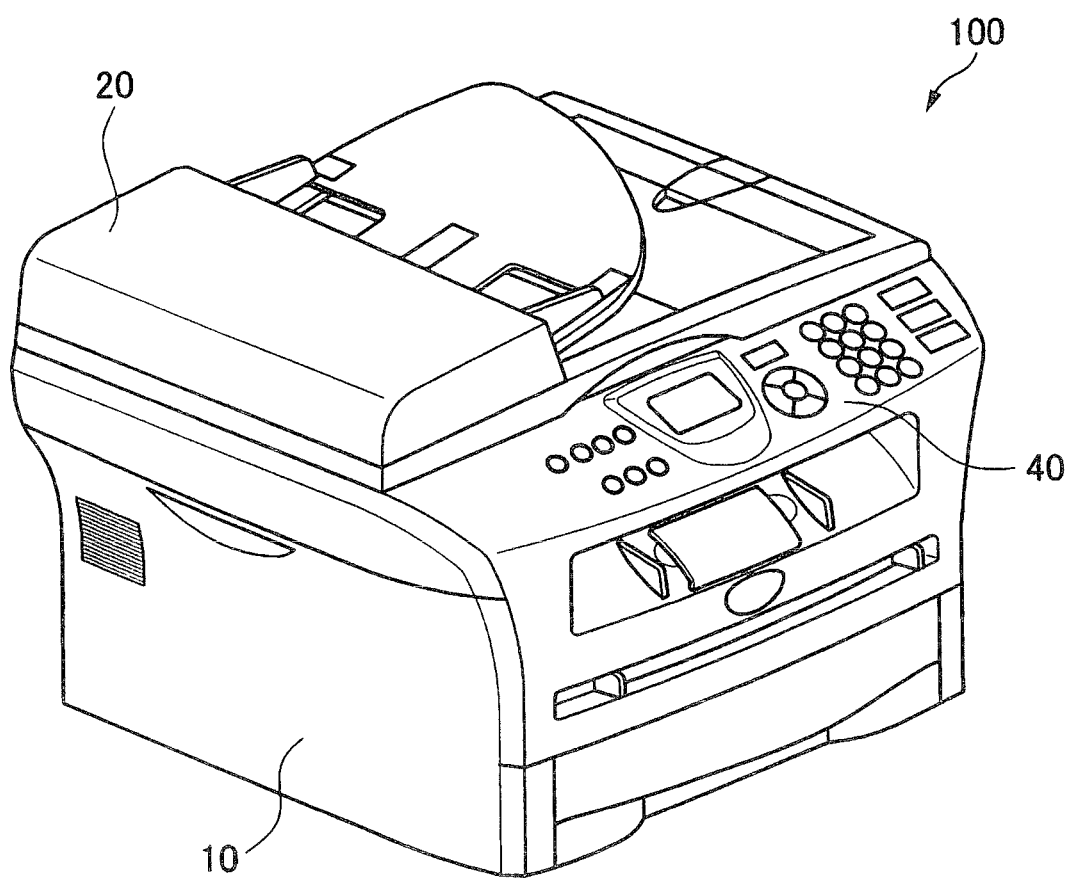
FIG. 1 is a perspective view showing a schematic configuration of a copying apparatus according to an embodiment.

The copying apparatus 100, as shown in FIG. 1, an image forming unit 10 which forms images on sheets, and an image reading unit 20 (an example of a reader) which reads images on documents. On the front face side of the image reading unit 20, an operation unit 40 (an example of a designating unit) consisting of a display unit consisting of a liquid crystal display and a button group including a start key, a stop key, and a numeric keypad, etc., is provided, and this operation unit 40 can display an operation status and enables input operations by a user.

The copying apparatus 100 has a black-and-white restriction function. When black-and-white restriction is designated, black-and-white printing is performed regardless of color attributes of documents. On the other hand, when black-and-white restriction is not designated, according to color attributes of documents, if a document is a color image document, color printing is performed, and if a document is a black-and-white image document, black-and-white printing is performed.

Configuration of Image Forming Unit

Figure 2:
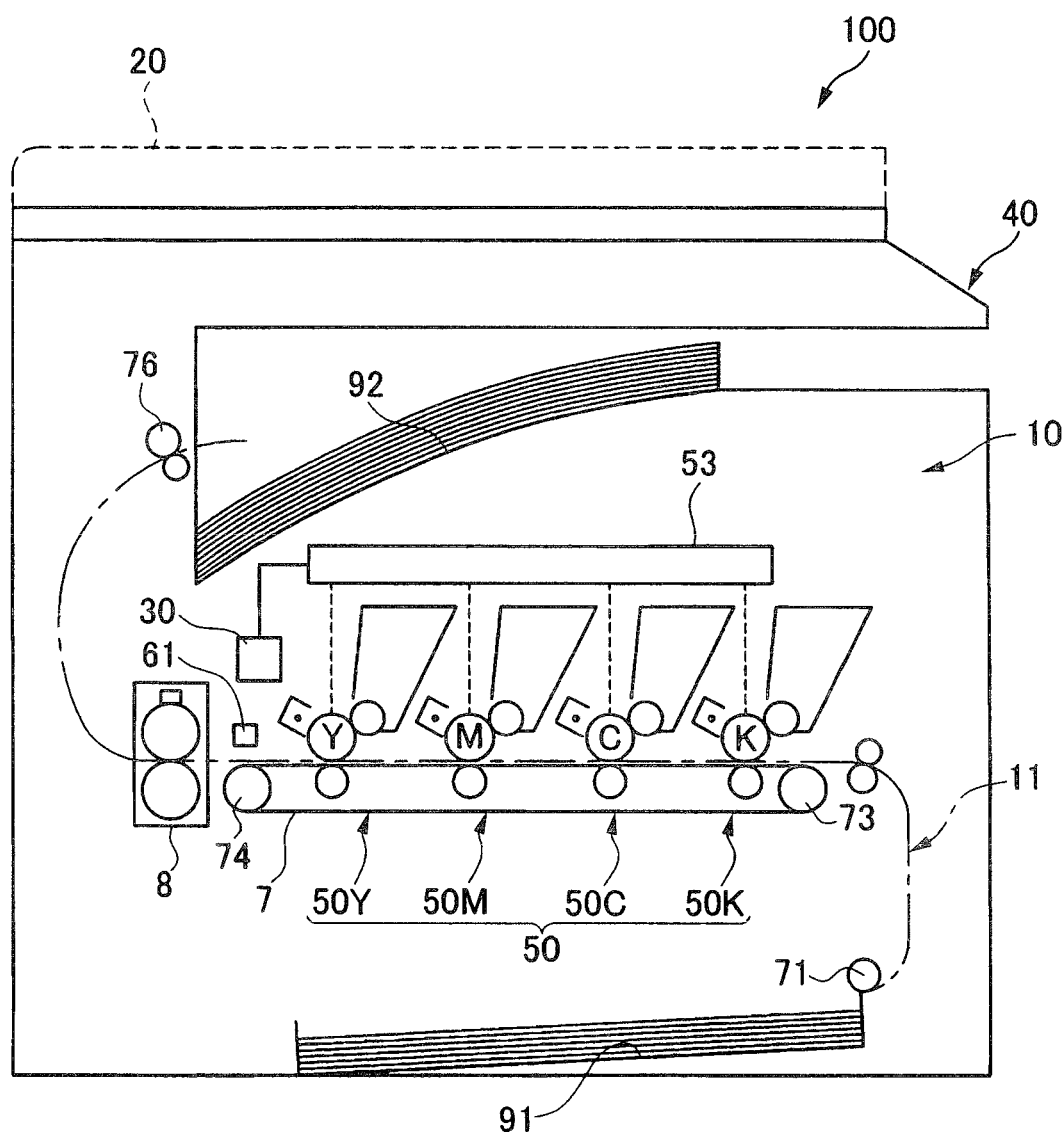
FIG. 2 is a conceptual diagram showing an internal configuration of an image forming unit of the copying apparatus of FIG. 1.

The image forming unit 10 includes, as shown in FIG. 2, a process unit 50 which forms a toner image and transfers the toner image onto a sheet, a fixing device 8 which fixes unfixed toner on a sheet, a paper feed tray 91 on which sheets on which images have not been formed are placed, and a copy receiving tray 92 on which sheets on which images have been formed are placed.

Moreover, inside the image forming unit 10, a substantially S-shaped conveyance path 11 (shown by the dashed line in FIG. 2) is provided so that sheets accommodated in the paper feed tray 91 positioned on the bottom portion are guided to the paper receiving tray 92 on the upper portion via ejection rollers 76 after passing through a paper feed roller 71, the process unit 50, and the fixing device 8.

The process unit 50 can form a color image, and includes process units for the respective colors of yellow (Y), magenta (M), cyan (C), and black (K) juxtaposed. Specifically, the process unit includes a process unit 50Y which forms an image in Y color, a process unit 50M which forms an image in M color, a process unit 50C which forms an image in C color, and a process unit 50K which forms an image in K color.

Further, the image forming unit 10 includes an exposure device 53 which irradiates the respective process units 50Y, 50M, 50C, and 50K with light, a conveyance belt 7 which is suspended and tensioned by conveyance rollers 73 and 74 and conveys sheets to the transfer positions of the respective process units 50Y, 50M, 50C, and 50K, and an image adjustment sensor 61 which detects resist patterns formed on the conveyance belt 7. The respective process units 50K, 50Y, 50M, and 50C form toner images according to the known electrophotographic method.

The image forming unit 10 takes out sheets placed on the paper feed tray 91 one by one and conveys the sheets to the process unit 50, and transfers toner images formed by the process unit 50 onto the sheets. At this time, in color printing, toner images are formed by the respective process units 50Y, 50M, 50C, and 50K and the respective toner images are superimposed on a sheet. On the other hand, in black-and-white printing, a toner image is formed by only the process unit 50K and transferred onto a sheet. Thereafter, the sheet onto which the toner image has been transferred is conveyed to the fixing device 8 and the toner image is thermally fixed on the sheet. Then, the sheet after fixing is ejected to the copy receiving tray 92.

The image adjustment sensor 61 is positioned at the downstream of the process units 50Y, 50M, 50C, and 50K and at the upstream of the fixing device 8 in the sheet conveying direction, and detects resist patterns formed on the conveyance belt 7.

The image forming unit 10 has a function for performing image adjustment for color printing. This image adjustment is performed with, for example, the following steps. First, the respective process units 50Y, 50M, 50C, and 50K form resist patterns as image patterns for image adjustment, and the respective process units 50Y, 50M, 50C, and 50K transfer the respective resist patterns onto the conveyance belt 7. Then, the image adjustment sensor 61 reads the respective resist patterns. Then, based on reading timings of the respective resist patterns, one certain color is defined as a reference color, and position deviations (adjustment values) of the other colors with respect to the reference color are calculated. Then, when forming images, position deviation amounts of the other colors are adjusted based on the adjustment values. The adjustment value update timing will be described later.

Configuration of Image Reading Unit

Figure 3:
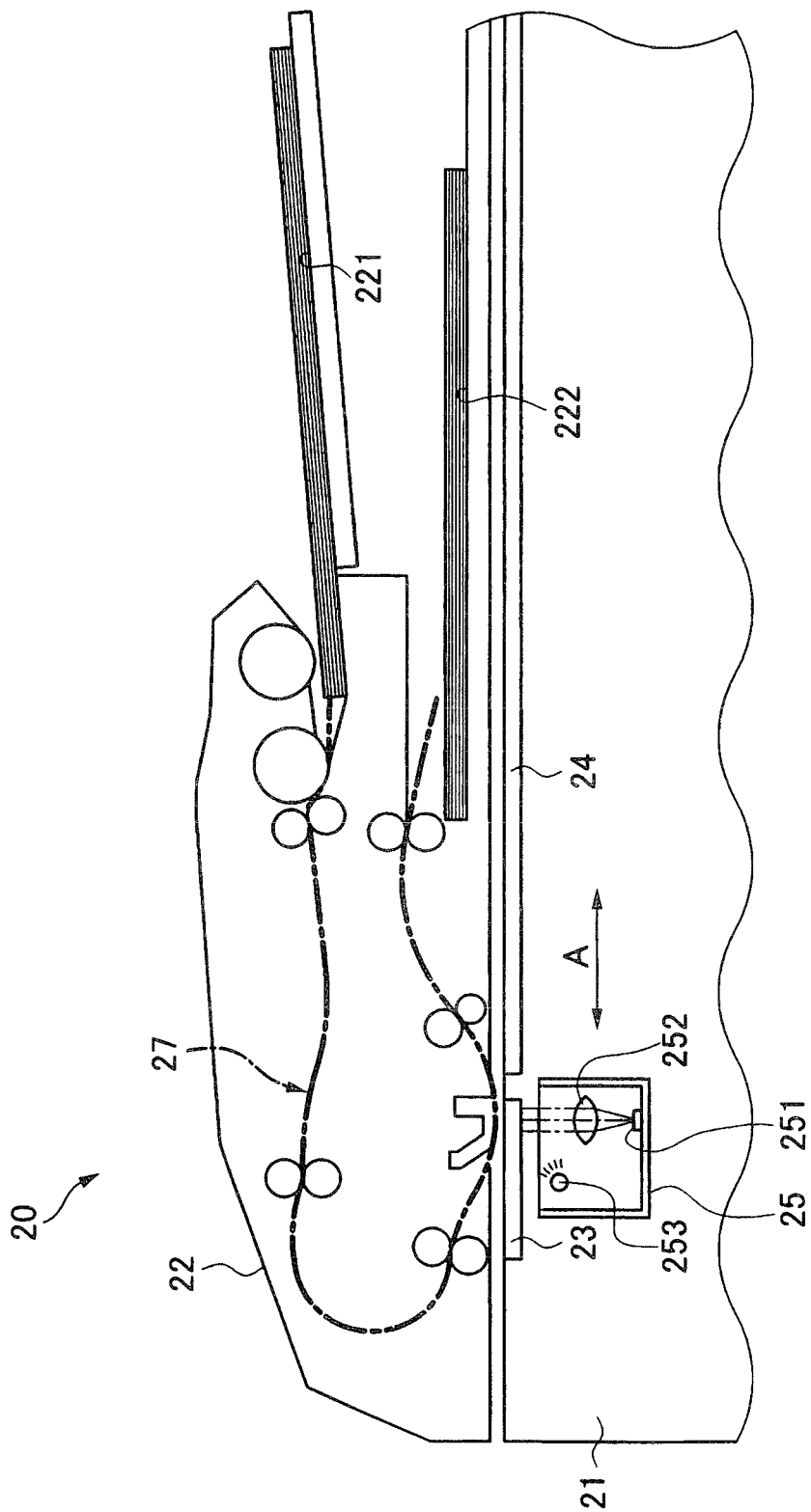
FIG. 3 is a conceptual diagram showing an internal configuration of an image reading unit of the copying apparatus of FIG. 1.

The image reading unit 20 includes, as shown in FIG. 3, a scanner unit 21 which reads images on documents, and an ADF (Automatic Document feeder) 22 which automatically conveys documents. The scanner unit 21 includes transparent platen glasses 23 and 24 positioned on the upper surface thereof, and an image sensor 25 positioned inside thereof.

The ADF 22 includes a document tray 221 on which documents before being read are placed, and an ejection tray 222 on which read documents are placed. Specifically, the document tray 221 is disposed above the ejection tray 222. The ADF 22 takes out documents placed on the document tray 221 one by one, conveys the documents into a conveyance path 27 inside the ADF 22, and after the documents are read, ejects the documents onto the ejection tray 222.

As a document reading method, three are available a flat bed (document-fixed scanning) method and an ADF (document-moving scanning) method. In the case of the flat bed method, documents are placed one by one on the platen glass 24 (hereinafter, referred to as "FB glass 24"). In this state, the image sensor 25 moves in the vertical scanning direction (orthogonal to the main scanning direction, the arrow A direction of FIG. 3), and at this time, images on the document are read line by line in the main scanning direction. On the other hand, in the case of the ADF method, documents are collectively placed on the document tray 221. Then, the image sensor 25 moves to a position opposed to the platen glass 23 (hereinafter, referred to as "ADF glass 23") and is fixed there. In this state, documents are conveyed one by one to a position opposed to the ADF glass 23 (reading position), and at this time, images on the document are read line by line in the main scanning direction.

The image sensor 25 is of a CIS (Contact Image Sensor) method, and includes a CMOS image pickup element 251, an optical element 252, and a light source 253 consisting of R, G, and B light emitting diodes. Image data of a document read by the image sensor 25 is output as RGB analog data of three colors of R (red), B (blue), and G (green). This RGB analog data is converted into RGB digital data by an A/D converter and then converted into CMYK data which can be used for printing in the image forming unit 10.

Electric Configuration of Copying Apparatus

Figure 4:
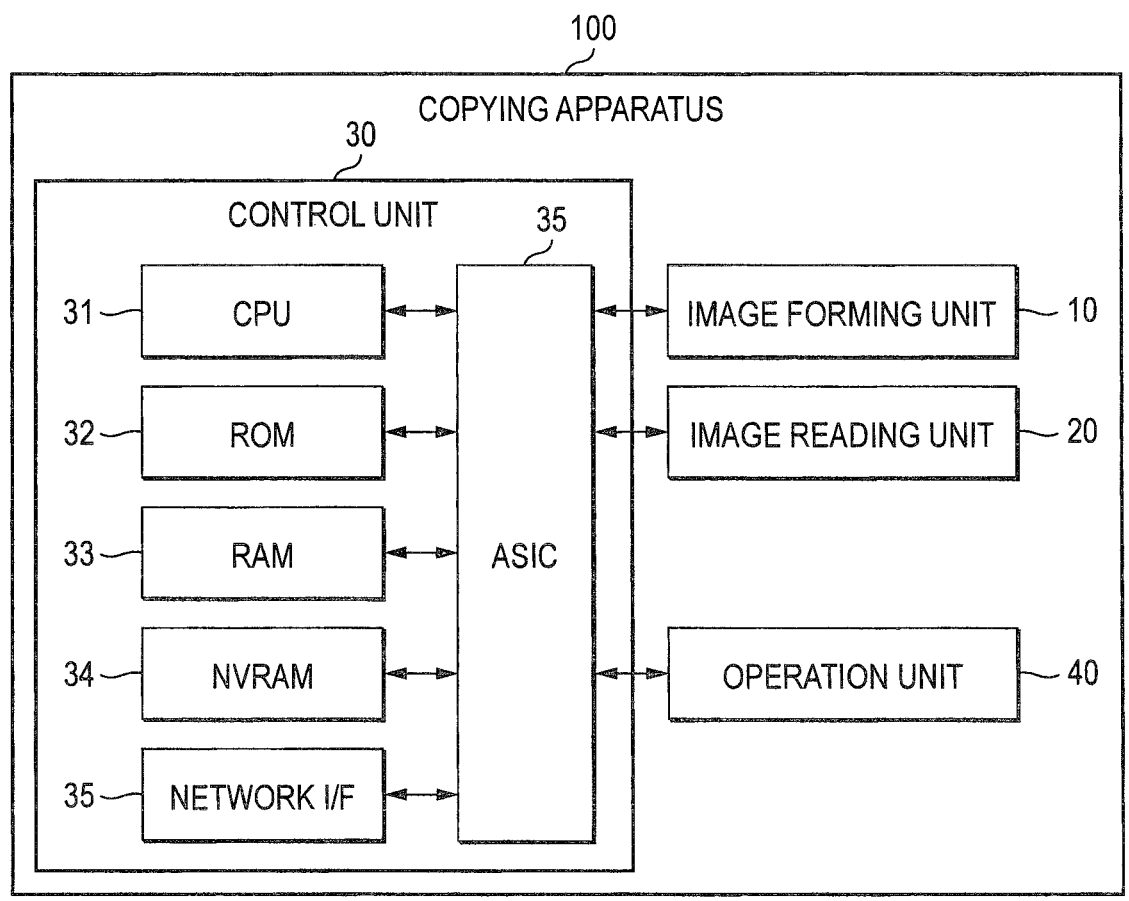
FIG. 4 is a block diagram showing an electric configuration of the copying apparatus of FIG. 1.

Subsequently, an electric configuration of the copying apparatus 100 will be described. The copying apparatus 100 includes, as shown in FIG. 4, a control unit 30 including a CPU 31, a ROM 32, a RAM 33, an NVRAM (nonvolatile RAM) 34, an ASIC 35, and a network interface 36. In addition, the control unit 30 is electrically connected with the image forming unit 10, the image reading unit 20, and the operation unit 40, etc. The image forming unit 10, the image reading unit 20, and the operation unit 40 are controlled by the control unit 30 and operate independently of each other.

In the ROM 32, various control programs for controlling the copying apparatus 100 and various settings and initial values, etc., are stored. The RAM 33 is used as a work area into which various control programs are read out or a storage area for temporarily storing image data.

The CPU 31 controls the components of the copying apparatus 100 (for example, a lighting timing of the exposure device 53, drive motors (not shown) of various rollers constituting the conveyance path 11, and a motor (not shown) for moving the image sensor constituting the image reading unit 20) via the ASIC 35 based on signals sent from control programs read out from the ROM 32 and various sensors while storing the processing results in the RAM 33 or the NVRAM 34.

The network interface 36 is connected to a network such as a LAN to enable connection with an external device in which a driver for the copying apparatus 100 is installed. The copying apparatus 100 can communicate print jobs via the network interface 36.

Copy Processing of Copying Apparatus

First Embodiment

Figure 5:
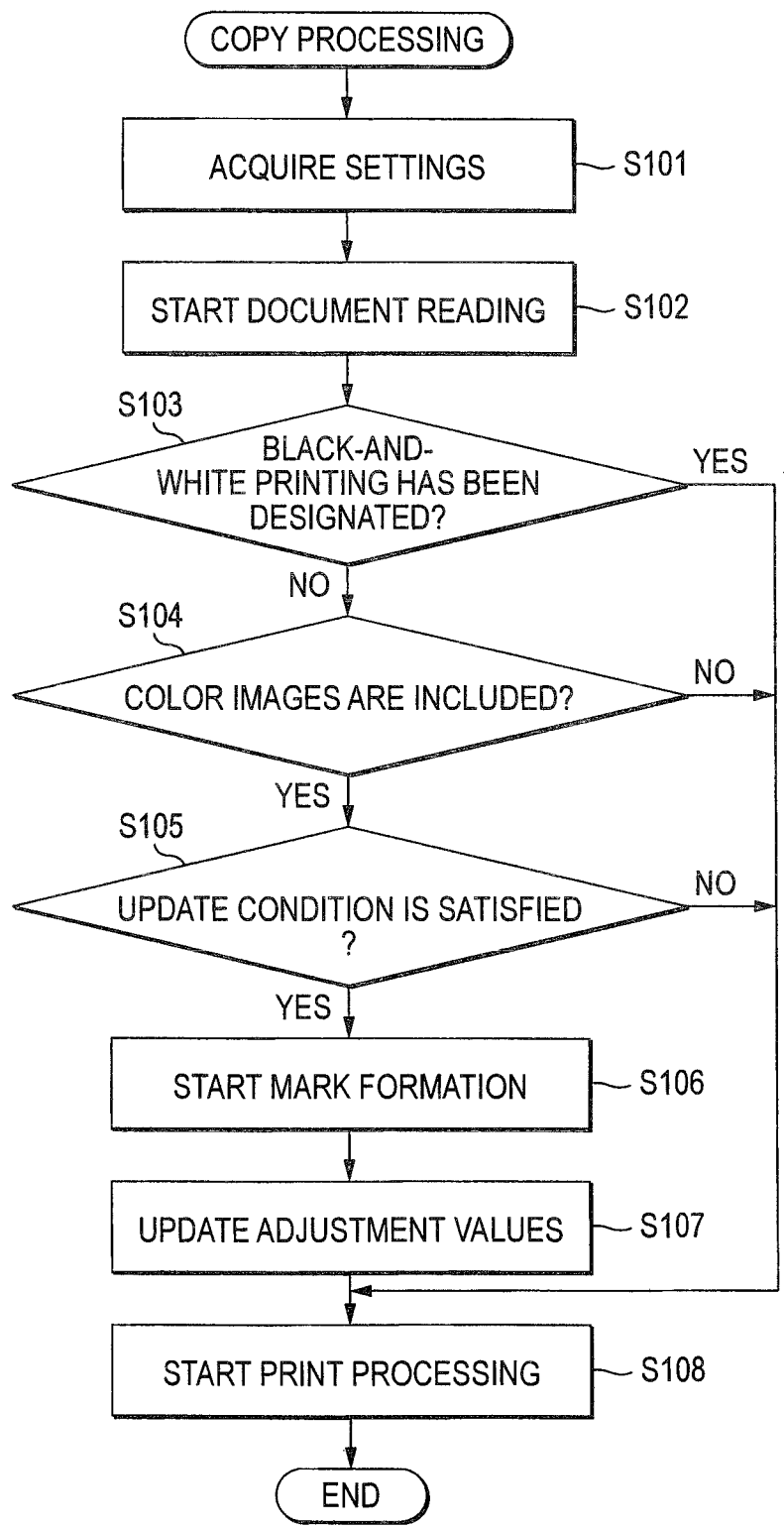
FIG. 5 is a flowchart showing steps of copy processing according to a first embodiment.

Subsequently, copy processing (an example of a detector, an image forming unit, and a confirming unit) which realizes copy control of the copying apparatus 100 will be described with reference to the flowchart of FIG. 5. The copying apparatus 100 starts copying when documents are set in the image reading unit 20 and a start button included in the operation unit 40 is depressed.

First, copy settings are acquired (S101). In the copying apparatus 100, various copy settings can be made by input operations into the operation unit 40. Copy settings are, for example, black-and-white restriction, print copies, magnification, and aggregate printing.

Next, the image reading unit 20 starts reading a document (S102). The image data output from the image reading unit 20 is converted from RGB data into CMYK data by the control unit 30. Moreover, the converted CMYK data (print data) is stored in the RAM 33 in a compressed state.

When reading a document, it is judged page by page of the document whether or not the document image is a color image or a black-and-white image, and the result is stored. As the judgment as to whether or not the image is a color image or a black-and-white image, for example, when the page is entirely composed of only pixels of R, G, and B color components substantially equivalent to each other (for example, the difference amounts among R, G, and B gray levels expressed in the range of 0 to 255 are within predetermined difference amounts such as R:G:B=200:205:195), the image is judged as a black-and-white image, and otherwise, the image is judged as a color image.

Next, it is judged whether or not black-and-white restriction has been designated (S103). When black-and-white restriction is designated (S103: YES), even when a color image is detected during document reading, the user's designation is given preference and black-and-white printing is performed. Accordingly, image adjustment for color printing is unnecessary. Therefore, without performing image adjustment for color printing, the process shifts to S108 and starts print processing.

When black-and-white restriction is not designated (S103: NO), it is judged whether or not a read image is a color image (S104). As described above, when the R, G, and B color components are substantially equivalent to each other and the image is judged as not a color image (S104: NO), black-and-white printing is performed, so that image adjustment for color printing is unnecessary. Therefore, without performing image adjustment for color printing, the process shifts to S108 and starts print processing.

On the other hand, when the image is a color image (S104: YES), it is judged whether or not an update condition for updating adjustment values for image adjustment is satisfied (S105). The update condition corresponds to, for example, a work amount (number of printed sheets or elapsed time) since the previous execution not less than a predetermined value prepared in advance. In addition, the adjustment values may be updated according to an environmental change such as a temperature change and a humidity change. In the copying apparatus 100, if adjustment values are updated each time printing is performed, toner consumption increases. On the other hand, even if adjustment values are not updated frequently, the influence of this on the image quality is small. Therefore, a condition for updating adjustment values for image adjustment is set. When the update condition is not satisfied (S105: NO), the process shifts to S108 and starts print processing.

When the update condition is satisfied (S105: YES), processing for updating adjustment values for image adjustment is performed. In the present embodiment, first, the respective process units 50Y, 50M, 50C, and 50K form marks (resist patterns in the present embodiment) for image adjustment, and the respective resist patterns are transferred onto the conveyance belt 7 (S106). At this time, the respective resist patterns are transferred at predetermined intervals in the belt conveying direction so as not to be superimposed on each other. Thereafter, the image adjustment sensor 61 reads positions of the respective resist patterns. Then, one of C, M, Y, and K is defined as a reference color, and the resist pattern in the reference color and the resist patterns in other colors are compared with each other to acquire deviation amounts. Adjustment values acquired here based on the position deviation amounts thus acquired are updated as new adjustment values (S107). The adjustment value update processing described here is an example, so that the processing is not limited to this.

Thereafter, the images in the respective colors are adjusted based on the adjustment values, and print processing for the adjusted images is started (S108). In the case of black-and-white printing, without performing image adjustment, the read image data of the document is directly used and printed. That is, when the image is judged as a black-and-white image, printing is performed by using only the process unit 50K for K color, and when the image is judged as a color image, printing is performed by using up to the process units 50C, 50M, 50Y, 50K for C, M, Y, and K colors. At this S108, R, G, and B components are substituted for each of the K color or the C, M, Y, and K colors. After printing all document pages, this process is ended.

In the first embodiment, the processing from the document reading start (S102) to the print processing start (S108) is performed for each document sheet. Then, each time a color image is detected, update processing for updating adjustment values is performed upon judging the adjustment value update condition. That is, reading, judgment on updating, and print steps are repeated for each document page. Moreover, if the adjustment values need to be updated, they are updated between print pages.

Second Embodiment

Figure 6:
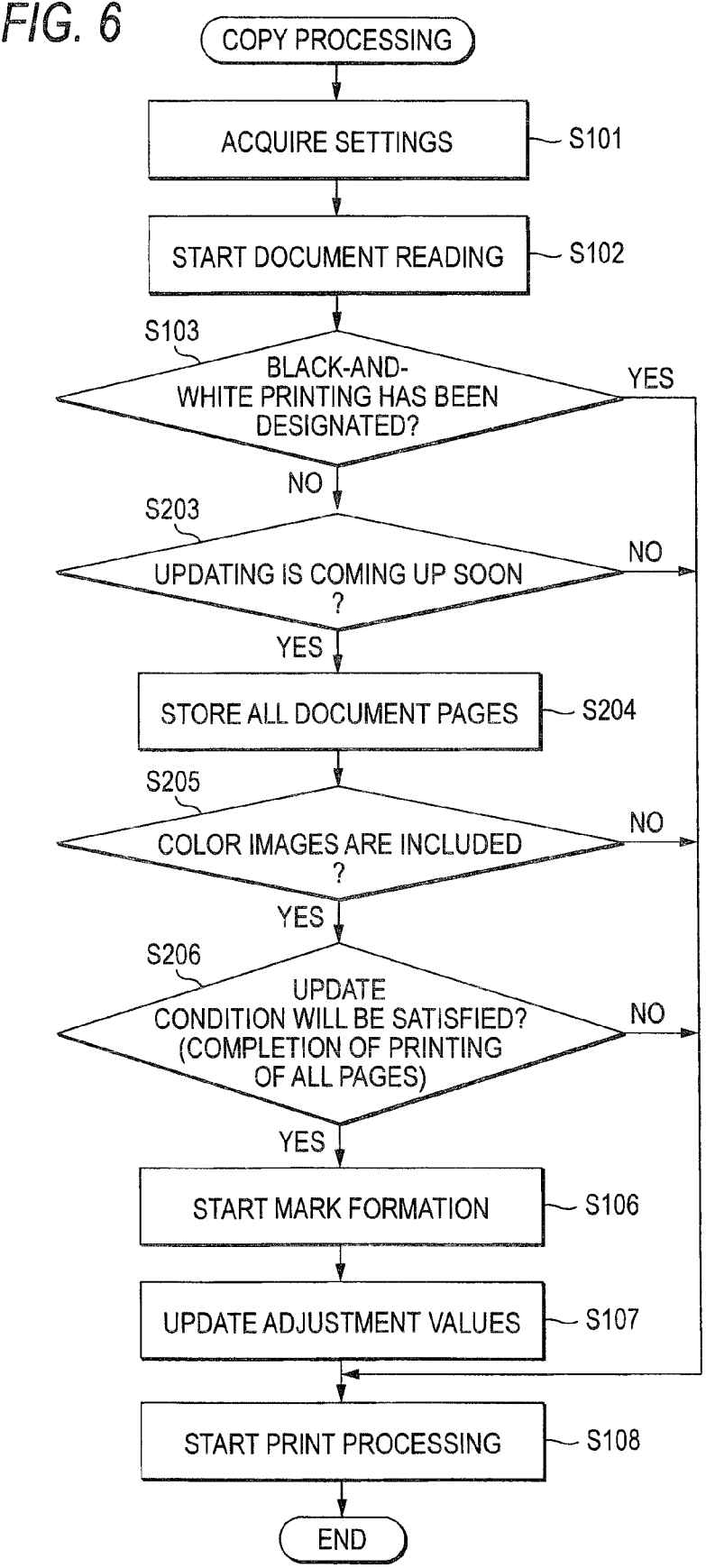
FIG. 6 is a flowchart showing steps of copy processing according to a second embodiment.

Subsequently, a second embodiment of copy processing will be described with reference to the flowchart of FIG. 6. In the second embodiment, when update values need to be updated before all document pages are printed, updating is performed before starting printing of the first page. This is different from the first embodiment in which adjustment value updating is performed even after starting printing of the first page. And, the same processing as in the first embodiment is designated by the same step number and description thereof is omitted.

First, copy settings are acquired (S101) and document reading is started (S102). Then, when black-and-white restriction is designated (S103: YES), print processing is started without updating adjustment values (S108).

On the other hand, when black-and-white restriction is not designated (S103: NO), it is judged whether or not execution of updating is coming up soon (S203). As judgment as to whether or not the execution is coming up soon, for example, when the adjustment value update condition is the number of printed sheets not less than Th1 since the previous execution, a threshold Th2 slightly smaller than the threshold Th1 is prepared, and when the number of printed sheets since the previous execution becomes not less than Th2, it can be judged that the execution is coming up soon. That is, a condition which will be satisfied at a stage slightly earlier than the adjustment value update condition is prepared, and the judgment can be made depending on whether or not this condition is satisfied. When updating of adjustment values is not coming up soon (S203: NO), the process shifts to S108 and starts print processing.

When updating of adjustment values is coming up soon (S203: YES), image data of all document pages are stored (S204). That is, the process does not shift to the next processing until all pages are read.

After image data of all pages are stored, it is judged whether or not any color image is included in the read document (S205). When no color image is included (S205: NO), without updating the adjustment values, the process shifts to S108 and starts print processing.

On the other hand, when color images are included (S205: YES), it is judged whether or not the adjustment value update condition will be satisfied between the respective color images before reaching the final page (S206). That is, it is judged whether or not updating will become necessary before completion of printing of all pages (S206). When the adjustment value update condition will not be satisfied (S206: NO), without updating the adjustment values, the process shifts to S108 and starts print processing.

When the adjustment value update condition will be satisfied (S206: YES), before starting printing of the first page, mark formation is started (S106). Then, adjustment values are acquired, and updating is performed (S107) by using adjustment values acquired based on the acquired deviation amounts as new adjustment values (S107). Thereafter, print processing is started (S108).

In the present second embodiment, when updating of adjustment values is coming up soon, all document pages are stored before starting printing, and before starting printing the first page, it is confirmed whether or not the update condition will be satisfied before completion of printing of all pages. Then, when the adjustment values need to be updated, they are updated before starting printing of the first page. Accordingly, it can be expected that the image quality is stabilized in one print job.

Third Embodiment

Figure 7:
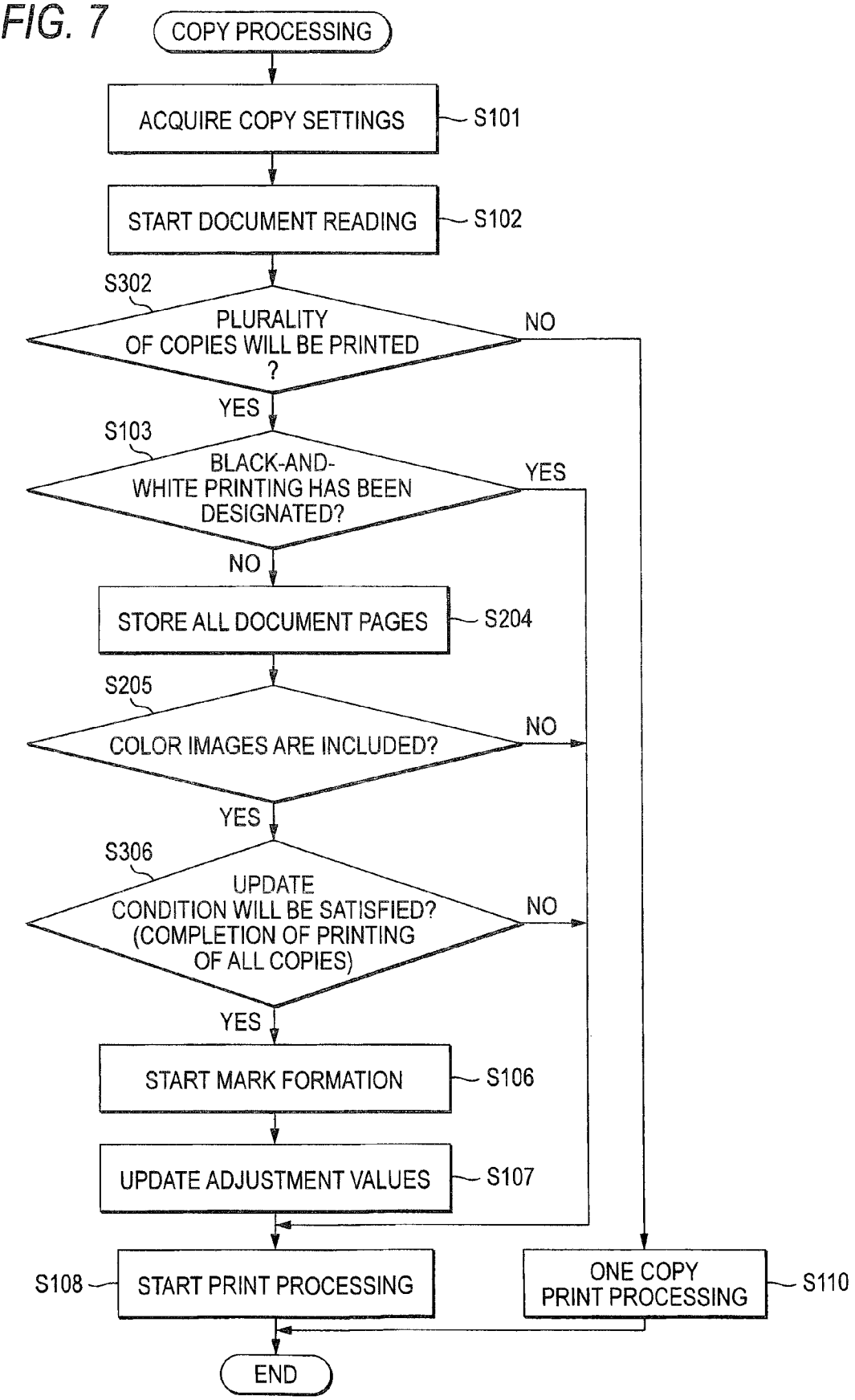
FIG. 7 is a flowchart showing steps of copy processing according to a third example.

Subsequently, a third embodiment of copy processing will be described with reference to the flowchart of FIG. 7. In the third embodiment, when image adjustment will become necessary before completion of printing of all print copies, image adjustment is performed before starting printing of the first page. This is different from the second embodiment in which the necessity of image adjustment is judged for each unit of document copy. And, the same processing as in the first embodiment or second embodiment is designated by the same step number and description thereof is omitted.

First, copy settings are acquired (S101), and document reading is started (S102). Then, it is judged whether or not copying of a plurality of copies has been designated (S302). When copying of a plurality of print copies is not set, that is, when the number of print copies is 1 (S302: NO), print processing for printing one copy of a document is performed (S110). Specifically, at S110, the processing from judgment on black-and-white restriction of S103 to print processing of S108 of copy processing of the second embodiment shown in FIG. 6 is performed.

On the other hand, when copying of a plurality of print copies is designated (S302: YES), it is judged whether or not black-and-white restriction has been designated (S103), and when black-and-white restriction is designated (S103: YES), print processing is started without updating the adjustment values (S108).

When black-and-white restriction is not designated (S103: NO), image data of all document pages are stored (S204). After image data of all pages are stored, it is judged whether or not color images are included in the read document (S205).

When no color image is included (S205: NO), without updating the adjustment values, the process shifts to S108 and starts print processing.

On the other hand, when color images are included (S205: YES), it is judged whether or not the adjustment value update condition will be satisfied between respective color documents before completion of printing of all print copies (S306). That is, it is confirmed whether or not updating will become necessary before completion of printing of the set print copies. When the adjustment value update condition will not be satisfied (S306: NO), without updating the adjustment values, the process shifts to S108 and starts print processing.

When the adjustment value update condition will be satisfied (S306: YES), before starting printing of the first page of the first copy, mark formation is started (S106). Then, adjustment values are acquired, and updating is performed by using the adjustment values acquired based on acquired deviation amounts as new adjustment values (S107). Thereafter, print processing is started (S108).

In the present third embodiment, when a plurality of copies are printed, all document pages are stored before starting printing, and before starting printing of the first page of the first copy, it is confirmed whether or not the adjustment value update condition will be satisfied before completion of printing of all print copies. Then, when updating of adjustment values will become necessary, updating is performed before starting printing of the first page of the first copy. Accordingly, in one print job, it can be expected that the image quality is further stabilized.

In the present third embodiment, it may also be judged whether or not updating is coming up soon similar to the second embodiment. In this case, for example, between S103 and S204, a step of judging whether or not updating is coming up soon (S203 of FIG. 6) is inserted, and when it is coming up soon, image data of all pages are stored, and when it is not coming up soon, the process shifts to print processing of S108.

As described in detail above, the copying apparatus 100 judges whether or not a read document image is a color image or a black-and-white image, and when it is judged as a color image, resist patterns are formed. In other words, unless a color image is detected, resist patterns are not formed. Accordingly, wasteful operations for forming marks for image adjustment even in black-and-white printing which does not need image adjustment can be reduced. Accordingly, the copying apparatus 100 can efficiently execute image adjustment for color printing.

In addition, the present embodiments are just exemplifications, and do not limit the present invention at all. Therefore, it is a matter of course that the present invention can be variously improved and altered without departure from the spirit of the present invention. For example, the present invention is applicable not only to copying apparatus but also to any equipment such as a multi-function printer as long as the equipment has a color copy function. Moreover, the image forming method of the process units is not limited to the electrophotographic method, but may be an ink-jet method.

Further, in the embodiments, as a method for acquiring adjustment values, resist patterns are formed on the conveyance belt 7 and the image adjustment sensor 61 reads the resist patterns and automatically calculates adjustment values, however, the configuration is not limited to this. For example, it is also allowed that resist patterns are formed on a sheet. Or, without limiting to the resist patterns for position adjustment, density patterns for density adjustment may be formed.

Further, in the embodiments, judgment on black-and-white restriction (S103), judgment on detection of a color image (S104), and judgment on adjustment value update condition (S105) are performed in this order, however, the order of judgements is not limited. For example, judgment on a color image may be performed first.

Further, in the embodiments, the machine has a black-and-white restriction function by which black-and-white printing is performed regardless of color attributes of documents, however, the machine may have a color restriction function by which color printing is performed regardless of color attributes of documents. When this color restriction is designated, mark formation is performed according to an image adjustment execution condition even if a document is a black-and-white image.

Further, in the embodiments, color scanning is performed at S102, however, when black-and-white restriction is designated, it can be switched to black-and-white scanning. That is, in the case of black-and-white restriction, not all R, G, and B components are necessarily acquired.

What is claimed is:

1. A copying apparatus comprising:
    a reader configured to read an image on a document;
    an image forming unit configured to form on a recording medium the image read by the reader;
    a controller configured to judge whether the image read by the reader is a color image or a black-and-white image and trigger the image forming unit to form a mark for image adjustment after the reader starts reading the image on the document and before the image forming unit starts forming the color image on the recording medium, if the controller judges that the image read by the reader is the color image; and
    an image adjustment sensor configured to sense the mark formed by the image forming unit;
    wherein the controller performs an image adjustment on the image read by the reader based on the mark sensed by the image adjustment sensor,
    wherein the image forming unit forms on the recording medium the image subjected to the image adjustment,
    wherein the controller judges whether a work amount since the last time the image forming unit forms the mark is not less than a predetermined value indicating that execution of the image adjustment is coming up soon,
    wherein if the controller judges that the work amount is not less than the predetermined value, the controller judges whether the image read by the reader is the color image or the black-and-white image, and
    wherein if the work amount is less than the predetermined value, the controller does not judge whether the image read by the reader is the color image or the black-and-white image.

2. The copying apparatus according to claim 1 comprising:
    a designating unit configured to designate black-and-white printing,
    wherein the image forming unit does not form the mark when the designating unit designates the black-and-white printing.

3. The copying apparatus according to claim 1, wherein
    If the controller judges that the work amount is not less than the predetermined value, the controller performs confirmation processing in which the controller stores images of all pages of the document and judges, before starting printing, whether or not a condition for forming the mark by the image forming unit will be satisfied if the image forming unit does not form the mark,
    if the controller judges that the condition for forming the mark will be satisfied, the image forming unit forms the mark before starting printing of a first page of the pages.

4. The copying apparatus according to claim 3, wherein
    in the confirmation processing, if printing a plurality of copies, the controller judges whether or not the condition for forming the mark will be satisfied before completion of printing of all of the copies if the image forming unit does not form the mark.

5. The copying apparatus according to claim 1, wherein the image forming unit includes a plurality of process units which print different color images, respectively.

6. The copying apparatus according to claim 1, wherein the controller determines that the image read by the reader is the color image if difference amount among color components of RGB are outside predetermined difference amounts.

7. A copying apparatus comprising:
    a reader configured to read an image on a document;
    an image forming unit configured to form on a recording medium the image read by the reader;
    a designating unit configured to designate black-and-white printing,
    a controller configured to judge whether the image read by the reader is a color image or a black-and-white image if the black-and-white printing is not designated by the designating unit and trigger the image forming unit to form a mark for image adjustment after the reader starts reading the image on the document and before the image forming unit starts forming the color image on the recording medium, if the controller judges that the image read by the reader is the color image; and
    an image adjustment sensor configured to sense the mark formed by the image forming unit,
    wherein the controller performs the image adjustment on the image read by the reader based on the mark sensed by the image adjustment sensor, and
    wherein the image forming unit forms on the recording medium the image subjected to the image adjustment,
    wherein if the black-and-white printing is designated by the designating unit, the controller does not judge whether the image read by the reader is the color image or the black-and-white image;
    wherein the controller performs confirmation processing in which the controller stores images of all pages of the document and judges, before starting printing, whether or not a condition for forming the mark by the image forming unit will be satisfied if the image forming unit does not form the mark,
    if the controller judges that the condition for forming the mark will be satisfied, the image forming unit forms the mark before starting printing of the first page of the pages;
    wherein the controller performs the confirmation processing if a work amount since the last time the image forming unit forms that mark is not less than a predetermined value indicating that execution of the image adjustment is coming up soon, and
    the controller does not perform the confirmation processing if the work amount is less than the predetermined value.

8. The copying apparatus according to claim 7, wherein the image forming unit does not form the mark when a work amount of the copying apparatus since the last time the image forming unit forms the mark is less than a predetermined value.

9. The copying apparatus according to claim 7, wherein in the confirmation processing, if printing a plurality of copies, the controller judges whether or not the condition for forming the mark will be satisfied before completion of printing of all of the copies if the image forming unit does not form the mark.

10. The copying apparatus according to claim 7, wherein the image forming unit includes a plurality of process units which print different color images, respectively.

11. The copying apparatus according to claim 7, wherein the controller determines that the image read by the reader is the color image if difference amount among color components of RGB are outside predetermined difference amounts.

12. A copying apparatus comprising:
  a reader configured to read an image on a document;
  an image forming unit configured to form on a recording medium the image read by the reader;
  a designating unit configured to designate black-and-white printing,
  a controller configured to judge whether a work amount since the last time the image forming unit forms the mark is not less than a predetermined value indicating that execution of an image adjustment is coming up soon, to judge whether the image read by the reader is a color image or a black-and-white image if the black-and-white printing is not designated by the designating unit and if the controller judges that a work amount is not less than the predetermined value, and trigger the image forming unit to form a mark for image adjustment after the reader starts reading the image on the document and before the image forming unit starts forming the color image on the recording medium, if the controller judges that the image read by the reader is the color image; and
  an image adjustment sensor configured to sense the mark formed by the image forming unit,
  wherein the controller performs an image adjustment on the image read by the reader based on the mark sensed by the image adjustment sensor, and
  wherein the image forming unit forms on the recording medium the image subjected to the image adjustment,
  wherein if the black-and-white printing is designated by the designating unit, the controller does not judge whether the image read by the reader is the color image or the black-and-white image.

* * * * *